United States Patent
Pyeon

(10) Patent No.: US 8,364,861 B2
(45) Date of Patent: Jan. 29, 2013

(54) ASYNCHRONOUS ID GENERATION

(75) Inventor: Hong Beom Pyeon, Kanata (CA)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 198 days.

(21) Appl. No.: 11/521,734

(22) Filed: Sep. 15, 2006

(65) Prior Publication Data

US 2007/0234071 A1    Oct. 4, 2007

Related U.S. Application Data

(60) Provisional application No. 60/787,710, filed on Mar. 28, 2006.

(51) Int. Cl.
*G06F 3/00*    (2006.01)

(52) U.S. Cl. ............ 710/30; 710/2; 710/8; 710/10

(58) Field of Classification Search .......... None
See application file for complete search history.

(56) References Cited

U.S. PATENT DOCUMENTS

| | | |
|---|---|---|
| 4,174,536 A | 11/1979 | Misunas et al. |
| 4,617,566 A | 10/1986 | Diamond |
| 4,733,376 A | 3/1988 | Ogawa |
| 4,796,231 A | 1/1989 | Pinkham |
| 4,899,316 A | 2/1990 | Nagami |
| 5,038,299 A | 8/1991 | Maeda |
| 5,126,808 A | 6/1992 | Montalvo et al. |
| 5,132,635 A | 7/1992 | Kennedy |
| 5,136,292 A | 8/1992 | Ishida |
| 5,175,819 A | 12/1992 | Le Ngoc et al. |
| 5,204,669 A | 4/1993 | Dorfe et al. |
| 5,243,703 A | 9/1993 | Farmwald et al. |
| 5,280,539 A | 1/1994 | Yeom et al. |
| 5,319,598 A | 6/1994 | Aralis et al. |
| 5,365,484 A | 11/1994 | Cleveland et al. |
| 5,404,460 A | 4/1995 | Thomsen et al. |
| 5,430,859 A | 7/1995 | Norman et al. |
| 5,440,694 A | 8/1995 | Nakajima |
| 5,452,259 A | 9/1995 | McLaury |
| 5,473,563 A | 12/1995 | Suh et al. |
| 5,473,566 A | 12/1995 | Rao |
| 5,473,577 A | 12/1995 | Miyake et al. |
| 5,475,854 A | 12/1995 | Thomsen et al. |
| 5,596,724 A | 1/1997 | Mullins et al. |
| 5,602,780 A | 2/1997 | Diem et al. |

(Continued)

FOREIGN PATENT DOCUMENTS

WO    WO 01/69411 A2    9/2001

OTHER PUBLICATIONS

"256 M x 8 Bit/128M x 16 Bit/512M x 8 Bit Nand Flash Memory," K9K4G08UIM, K9F2G08U0M, K9F2G16U0M, Rev. 1.0, Samsung Electronics Co., Ltd., May 6, 2005, pp. 1-41.

(Continued)

*Primary Examiner* — Kris Rhu
(74) *Attorney, Agent, or Firm* — Hamilton, Brook, Smith & Reynolds, P.C.

(57) ABSTRACT

A technique for automatically establishing device IDs for devices in a daisy chain cascade arrangement. For each device, a write ID operation is initiated at the device to cause the device to enter a generate/write ID mode. While in this mode, a first value is input to the device. The device generates a second value from the first value. The device outputs the generated second value from the device to a next device in the daisy chain cascade which uses the second value as a first value for the next device. The device then establishes its ID from the first value. The process is repeated for all devices in the daisy chain cascade arrangement.

16 Claims, 14 Drawing Sheets

U.S. PATENT DOCUMENTS

| | | | |
|---|---|---|---|
| 5,636,342 | A | 6/1997 | Jeffries |
| 5,671,178 | A | 9/1997 | Park et al. |
| 5,721,840 | A | 2/1998 | Soga |
| 5,737,544 | A * | 4/1998 | Wszolek .................. 710/107 |
| 5,740,379 | A | 4/1998 | Hartwig |
| 5,761,146 | A | 6/1998 | Yoo et al. |
| 5,771,199 | A | 6/1998 | Lee |
| 5,793,767 | A * | 8/1998 | Soda et al. ................ 370/397 |
| 5,802,006 | A | 9/1998 | Ohta |
| 5,806,070 | A | 9/1998 | Norman et al. |
| 5,818,785 | A | 10/1998 | Ohshima |
| 5,828,899 | A | 10/1998 | Richard et al. |
| 5,835,935 | A | 11/1998 | Estakhri et al. |
| 5,859,809 | A | 1/1999 | Kim |
| 5,872,994 | A | 2/1999 | Akiyama et al. |
| 5,937,425 | A | 8/1999 | Ban |
| 5,938,750 | A | 8/1999 | Shaberman |
| 5,941,974 | A | 8/1999 | Babin |
| 5,959,930 | A | 9/1999 | Sakurai |
| 5,995,405 | A | 11/1999 | Trick |
| 5,995,417 | A | 11/1999 | Chen et al. |
| 6,002,638 | A | 12/1999 | John |
| 6,085,290 | A | 7/2000 | Smith et al. |
| 6,091,660 | A | 7/2000 | Sasaki et al. |
| 6,102,963 | A | 8/2000 | Agrawal |
| 6,107,658 | A | 8/2000 | Itoh et al. |
| 6,144,579 | A | 11/2000 | Taira |
| 6,148,364 | A | 11/2000 | Srinivasan et al. |
| 6,172,911 | B1 | 1/2001 | Tanaka et al. |
| 6,178,135 | B1 | 1/2001 | Kang |
| 6,304,921 | B1 | 10/2001 | Rooke |
| 6,317,350 | B1 | 11/2001 | Pereira et al. |
| 6,317,352 | B1 | 11/2001 | Halbert et al. |
| 6,317,812 | B1 | 11/2001 | Lofgren et al. |
| 6,378,018 | B1 | 4/2002 | Tsern et al. |
| 6,438,064 | B2 | 8/2002 | Ooishi |
| 6,442,098 | B1 | 8/2002 | Kengeri |
| 6,535,948 | B1 | 3/2003 | Wheeler et al. |
| 6,584,303 | B1 | 6/2003 | Kingswood et al. |
| 6,594,183 | B1 | 7/2003 | Lofgren et al. |
| 6,601,199 | B1 | 7/2003 | Fukuda et al. |
| 6,611,466 | B2 | 8/2003 | Lee et al. |
| 6,658,509 | B1 | 12/2003 | Bonella et al. |
| 6,658,582 | B1 | 12/2003 | Han |
| 6,680,904 | B1 | 1/2004 | Kaplan et al. |
| 6,715,044 | B2 | 3/2004 | Lofgren et al. |
| 6,718,432 | B1 * | 4/2004 | Srinivasan .................. 711/108 |
| 6,732,221 | B2 | 5/2004 | Ban |
| 6,754,807 | B1 | 6/2004 | Parthasarathy et al. |
| 6,763,426 | B1 | 7/2004 | James et al. |
| 6,807,103 | B2 | 10/2004 | Cavaleri et al. |
| 6,816,933 | B1 | 11/2004 | Andreas |
| 6,850,443 | B2 | 2/2005 | Lofgren et al. |
| 6,853,581 | B1 | 2/2005 | Haba et al. |
| 6,853,573 | B2 | 2/2005 | Kim et al. |
| 6,928,501 | B2 | 8/2005 | Andreas et al. |
| 6,944,697 | B2 | 9/2005 | Andreas |
| 6,950,325 | B1 | 9/2005 | Chen |
| 6,967,874 | B2 | 11/2005 | Hosono |
| 6,996,644 | B2 | 2/2006 | Schoch et al. |
| 7,032,039 | B2 | 4/2006 | DeCaro |
| 7,073,022 | B2 | 7/2006 | El-Batal et al. |
| 7,170,795 | B2 | 1/2007 | Lee |
| 2002/0188781 | A1 | 12/2002 | Schoch et al. |
| 2003/0074505 | A1 * | 4/2003 | Andreas et al. ................ 710/110 |
| 2003/0128702 | A1 * | 7/2003 | Satoh et al. ................ 370/390 |
| 2004/0001380 | A1 | 1/2004 | Becca et al. |
| 2004/0019736 | A1 | 1/2004 | Kim et al. |
| 2004/0024960 | A1 | 2/2004 | King et al. |
| 2004/0039854 | A1 | 2/2004 | Estakhri et al. |
| 2004/0196140 | A1 * | 10/2004 | Sid .................. 340/3.1 |
| 2004/0199721 | A1 | 10/2004 | Chen |
| 2004/0230738 | A1 | 11/2004 | Lim et al. |
| 2005/0035895 | A1 | 2/2005 | Byrne et al. |
| 2005/0086413 | A1 | 4/2005 | Lee et al. |
| 2005/0095769 | A1 | 5/2005 | Takase et al. |
| 2005/0160218 | A1 | 7/2005 | See et al. |
| 2005/0213421 | A1 | 9/2005 | Polizzi et al. |
| 2006/0050594 | A1 | 3/2006 | Park |
| 2007/0076479 | A1 * | 4/2007 | Kim et al. ................ 365/185.11 |

OTHER PUBLICATIONS

"8-megabit 2.5-volt Only or 2.7-volt Only DataFlash®," technical specification, Atmel, Rev. 2225H-DFLSH (2004).
"K9XXG08UXM Preliminary Flash Memory," technical specification, Samsung Electronics.
"1024K1$^2$C™ CMOS Serial EEPROM," technical specification, Microchip Technology Inc. (2006).
"The I$^2$C-Bus Specification," Version 2.1, Philips Semiconductors, Jan. 2000.
"16 Mbit LPC Serial Flash," technical specification, Silicon Storage Technology Inc. (2006).
"16 Mbit SPI Serial Flash," preliminary specification, Silicon Storage Technology Inc. (2005).
"2Mbit, Low Voltage, Serial Flash Memory with 40 MHz SPI Bus Interface," technical specification, STMicroelectronics Group of Companies (2005).
"NAND Flash Applications Design Guide," Revision 1.0, Toshiba America Electronics Components, Inc., (Apr. 2003).
King, et al., "Communicating with Daisy Chained MCP42XXX Digital Potentiometers", Microchip AN747, pp. 1-8, 2001.
"High Speed Small Sectored SPI Flash Memory," Atmel Corp., pp. 1-22 (2006).
64 Megabit CMOS 3.0 Volt Flash Memory with 50MHz SPI.
"DiskOnChip H1 4Gb (512MByte) and 8 Gb (1 GByte) High Capacity Flash Disk with NAND and x2 Technology," Data Sheet, Rev. 0.5 (Preliminary), M-Systems Flash Disk Pioneers Ltd., pp. 1-66, (2005).
Tal, A., "Guidelines for Integrating DiskOnChip in a Host System," AP-DOC-1004, Rev. 1.0, M-Systems Flash Disk Pioneers Ltd., pp. 1-15, (2004).
OneNAND4G(KFW4G16Q2M-DEB6), OneNAND2G(KFH2G16Q2M-DEB6), OneNAND1G(KFW1G16Q2M-DEB6) Flash Memory, OneNAND™ Specification Ver. 1.2, Samsung Electronics, pp. 1-125, (Dec. 23, 2005).
Kennedy, J., et al., "A 2Gb/s Point-to-Point Heterogeneous Voltage Capable DRAM Interface for Capacity-Scalable Memory Subsystems," *ISSCC 2004/Session 1/DRAM/11.8*, IEEE International Solid-State Circuits Conference (2004).
Kim, Jae-Kwan, et al., "A 3.6Gb/s/pin Simultaneous Bidirectional (SBD) I/O Interface for High-Speed DRAM", *ISSCC 2004/Session 22/DSL and Multi-Gb/s I/O 22.7*, IEEE International Solid-State Circuits Conference (2004).
"HyperTransport TM I/O Link Specification", Revision 2.00, Document No. HTC20031217-0036-00, HyperTransportTM Technology Consortium, pp. 1-325 (2001).
"IEEE Standard for High-Bandwidth Memory Interface Based on Scalable Coherent Interface (SCI) Signaling Technology (RamLink)", *IEEE Std.* 1596.4-1996, The Institute of Electrical Electronics Engineers, Inc., pp. i-91, (Mar. 1996).
"High-Speed Memory Architectures for Multimedia Applications", *Circuits & Devices*, IEEE 8755-3996/97/, pp. 8-13, Jan. 1997.
Gjessing, S., et al., "RamLink: A High-Bandwidth Point-to-Point Memory Architecture", IEEE 0-8186-2655-0/92, pp. 328-331, 1992.
Gjessing, S., et al., "Performance of the RamLink Memory Architecture", *Proceedings of the Twenty-Seventh Annual Hawaii International Conference on System Sciences*, IEEE 1060-3425/94, pp. 154-162, 1994.
Gjessing, S., et al., "A RAM link for high speed", *Special Report/Memory*, IEEE Spectrum, pp. 52-53, (Oct. 1992).
Diamond, S. L., "SyncLink: High-speed DRAM for the future", *Micro Standards*, IEEE Micro, pp. 74-75, (Dec. 1996).
"DDR2 Fully Buffered DIMM 240pin FBDIMMS based on 512Mb C-die", Rev. 1.3 Sep. 2006, Samsung Electronics, pp. 1-32 (Sep. 2006).
"HyperTransportTM IO Link Specification", Revision 3.00, Document No. HTC20051222-0046-0008, HyperTransport Technology Consortium, pp. 1-428, (Apr. 2006).

"Toshiba MOS Digital Integrated Circuit Silicon Gate CMOS," TH58NVG1S3AFT05, Toshiba Corporation, May 19, 2003, pp. 1-32.

Intel® Advanced +Boot Block Flash Memory (C3),: May 2005, Intel Corporation, pp. 1-72.

"256 M x 8 Bit/128M x 16 Bit/512M x 8 Bit NAND Flash Memory," K9K4G08U1M, K9F2G08U0M, K9F2G16U0M, Rev. 1.0, Samsung Electronics Co., Ltd., May 6, 2005, pp. 1-41.

* cited by examiner

ASYNCHRONOUS ID GENERATION

RELATED APPLICATION(S)

This application claims the benefit of U.S. Provisional Application No. 60/787,710, filed on Mar. 28, 2006. The entire teachings of the above application are incorporated herein by reference in its entirety as though fully set forth herein.

BACKGROUND

Today computer-based systems can be found most everywhere and have made inroads into many devices that are used by society everyday, such as cell phones, handheld computers, automobiles, medical devices, personal computers and the like. In general, society has placed much reliance on computer-based systems to handle everyday tasks such as simple tasks like balancing checkbooks to relatively complex tasks such as predicting the weather. As technology improves, more and more tasks are migrated to computer-based systems. This, in turn, causes society to become more and more reliant on these systems.

A typical computer-based system comprises a system board and optionally one or more peripheral devices, such as display units and disk units. The system board often contains one or more processors, a memory subsystem and other circuitry, such as serial device interfaces, network device controllers and hard disk controllers.

The type of processors that are employed on a particular system board usually depends on the type of tasks performed by the system. For example, a system that performs a limited set of tasks, such as monitor emissions generated by an automobile engine and adjust an air/fuel mixture to ensure the engine is burning fuel completely may employ a simple specialized processor that is tailored to performing these tasks. On the other hand, a system that performs many different tasks, such as managing many users and running many different applications, may employ one or more complex processors that are general purpose in nature, configured to perform high-speed calculations and manipulate data to minimize the response time to servicing the users' requests.

The memory subsystem is a storage that holds information (e.g., instructions, data values) used by the processors. The memory subsystem typically comprises controller circuitry and one or more memory devices. The controller circuitry is usually configured to interface the memory devices with the processors and enable the processors to store and retrieve information to and from the memory devices. The memory devices hold the actual information.

Like the processors, the type of devices employed in a memory subsystem is often driven by the type of tasks performed by the computer system. For example, a computer system may have the task of having to boot without the assistance of a disk drive and execute a set of software routines that do not change often. Here, the memory subsystem may employ non-volatile devices, such as flash memory devices, to store the software routines. Other computer systems may execute very complex tasks that require a large high-speed data store to hold large portions of information. Here, the memory subsystem may employ high-speed high-density Dynamic Random Access Memory (DRAM) devices to store the information.

Demand for flash memory devices has continued to grow significantly because these devices are well suited in various embedded applications that require non-volatile storage. For example, flash is widely used in various consumer devices, such as digital cameras, cell phones, USB flash drives and portable music players, to store data used by these devices. Market demand for flash memory has led to tremendous improvements in flash memory technology over the past several years both in terms of speed and density. These improvements have led to the prediction that flash memory-based devices may one day replace hard disk drives in applications that continue to use disk drives for mass storage.

Some flash devices employ serial interfaces which are used to perform operations, such as read, write and erase operations, on memory contained in the devices. These operations are typically selected on a device using command strings that are serially fed to the devices. The command strings typically contain a command that represents the operation to be selected as well as parameters. For example, a write operation may be selected by serially feeding an information string to the device that contains a write command, the data to be written and an address in the memory where the data is to be written.

SUMMARY

Some memory subsystems employ multiple flash devices with serial interfaces. Here, the command string may be fed to all of the devices even though the command may only be performed on one of the devices. To select the device on which the command is to be performed, the command string may contain a device identifier (ID) that identifies the flash device to which the command is directed. Each device receiving the command string compares the device ID contained in the command string to an ID associated with the device. If the two match, the device assumes the command is directed to the device and performs the command.

One problem with the above-described arrangement involves establishing a device ID for each device. One technique that may be used to establish a device ID for a device is to hardwire an internal unique device ID into the device. One drawback with this approach, however, is that if large volumes of devices are produced, the size of the device ID may have to be quite large in order to ensure that each device contains a unique device ID. Managing a large-sized device ID may add significant complexity to the device which in turn may increase the cost of producing the device. In addition, reclaiming device IDs that are associated with devices that are no longer in use may further add to the complexity of this scheme.

Another approach to assigning device IDs to devices involves externally hardwiring a device ID for each device. Here, the device ID may be specified by wiring various pins on the device to certain states to establish a device ID for the device. The device reads the wired state of the pins and establishes its ID from the read state. One drawback with this approach, however, is that external wiring is needed to assign the device ID for each device. This may add to the complexity of, e.g., printed circuit boards (PCBs) that hold the memory devices. Another drawback with this approach is that it may require pins to be dedicated for the assignment of the device ID. This may consume precious resources that may be otherwise better used. In addition, dedicating pins for the assignment of the device ID may require a greater footprint for the device than if pins were not used to assign the device ID.

The techniques described herein overcome these shortcomings by automatically establishing a device ID for a device, for example, in a daisy chain cascade arrangement, in a manner that does not require special internal or external hardwiring of the device ID. According to an aspect of the techniques described herein, a first value is input to a first device in an arrangement comprising multiple devices (e.g., a serial daisy chain cascade arrangement) using inputs that are also used by the first device to input other information to the device (e.g., data, commands, control signals). The device establishes its ID from the first value. A second value is then generated from the first value and output from the first device to a second device in the arrangement via outputs that are also used by the first device to output other information (e.g., signals, data) from the device.

In an embodiment of the techniques described herein, a write ID operation is initiated at a device in a daisy chain cascade arrangement to cause the device to establish its ID. A first value is input into a first device by acquiring the state of one or more inputs of the first device. The first device then establishes its device ID from the first value which may include placing the first value in storage (e.g., a device ID register) associated with the device. The first device generates a second value from the acquired state of the inputs. The first device outputs the second value from the first device via outputs of the first device to a second device in the daisy chain cascade. The second device inputs the value output by the first device and repeats this process to establish its ID.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of exemplary embodiments of the invention follows.

In accordance with the techniques described herein, a first value is input into a first device configured in a daisy chain cascade wherein the first value is used to establish an identifier (ID) for the first device. The ID is used by the first device as a device ID that determines if information (e.g., commands) input into the first device is directed to the device. A second value is generated by the first device from the first value. The second value is transferred from the first device to a second device in the daisy chain cascade via outputs of the first device.

Figure 1:
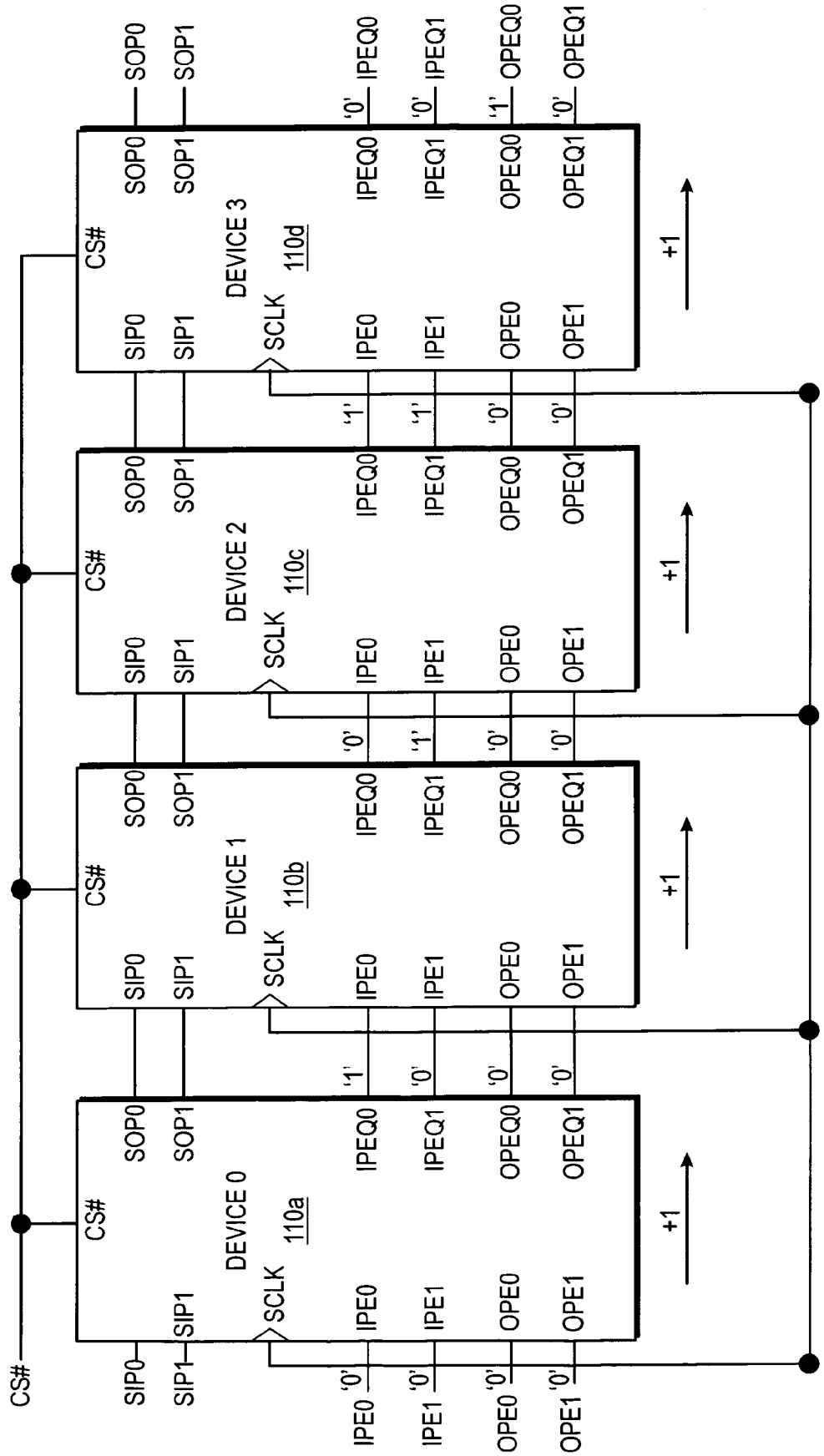
FIG. 1 is a high-level block diagram of a plurality of devices coupled in a daisy chain cascade arrangement that may be used with the techniques described herein.

FIG. 1 is a high-level block diagram of a plurality of devices 110 coupled in a daisy chain cascade arrangement. Although the devices 110 are illustrated as being daisy-chained, the techniques described herein can be applied to devices in other device connection modes. In this example, each device 110 contains two ports (port 0 and port 1) and comprises a chip select input (CS#), clock input (SCLK), and for each port a serial input port (SIP) input, serial output port (SOP) output, input port enable (IPE) input, output port enable (OPE) input, IPE output (IPEQ) and OPE output (OPEQ). The SIP input, SOP output, IPE input, OPE input, IPEQ output and OPEQ output for port 0 are labeled SIP0, SOP0, IPE0, OPE0, IPEQ0 and OPEQ0, respectively, and for port 1 SIP1, SOP1, IPE1, OPE1, IPEQ1 and OPEQ1, respectively.

The SIP input is used to transfer information (e.g., command, address and data information) into the device 110. The SOP output is used to transfer information from the device 110. The SCLK input is used to provide an external clock signal to the device 110 and the CS# input is used to provide a chip select signal to the device 110.

The SIP input and SOP output are connected between devices 110 in the daisy chain cascade arrangement such that the SOP output of a device 110 earlier in the daisy chain cascade is coupled to the SIP input of the next device 110 in the daisy chain cascade. For example, the SOP0 and SOP1 outputs of device 10a are coupled to the SIP and SIP1 inputs, respectively, of device 110b.

The SCLK input of each device 110 is fed with a clock signal from, e.g., a memory controller (not shown). The clock signal is distributed to each device 110 via a common link. As will be described further below, SCLK is used, inter alia, to cause information that is input to the device 110 to be latched at various registers contained in the device 110. Information that is input to a device 110 may be latched at different times of the clock signal fed to the SCLK input. For example, in a single data rate (SDR) implementation, information input to the device 110 at the SIP input may be latched at either the rising or falling edge of the SCLK clock signal. Alternatively, in a double data rate (DDR) implementation, both the rising and falling edges of the SCLK clock signal may be used to latch information input at the SIP input.

The CS# input of each device is a conventional chip select that selects the device. This input is illustratively coupled to a common link which provides a chip select signal to all of the devices 110 and allows all devices 110 to be selected simultaneously.

The IPE input is used to input an IPE signal to the device 110. The IPE signal is used by the device 110 to enable an SIP input such that when IPE is asserted information may be serially input to the device 110 via the enabled SIP input. For device 110, an IPE signal input to the IPE0 input enables information to be input at the SIP0 input. Likewise, for device 110, an IPE signal input to the IPE1 input enables information to be input at the SIP1 input.

The OPE input is used to input an OPE signal to the device 110. The OPE signal is used by the device 110 to enable an SOP output such that when OPE is asserted information may be serially output from the device 110 via the enabled SOP. For device 110, an OPE signal input to the OPE0 input enables information to be output from the device via the SOP0 output. Likewise, for device 110, an OPE signal input to the OPE1 input enables information to be output form the device via the SOP1 output.

The IPEQ and OPEQ are outputs that output a latched state of IPE and OPE signals, respectively, from the device 110. The IPEQ0 output outputs a latched state of an IPE signal input to the device's IPE0 input and the IPEQ1 output outputs a latched state of an IPE signal input to the device's IPE1 input. The OPEQ0 output outputs a latched state of an OPE signal input to the device's OPE0 input and the OPEQ1 output outputs a latched state of an OPE signal input to the device's OPE1 input.

An example of a device that may be adapted to implement the techniques described herein is a Multiple Independent Serial Link (MISL) Memory device described in commonly owned U.S. patent application Ser. No. 11/324,023, titled "Multiple Independent Serial Link Memory" which is hereby incorporated by reference in its entirety as though fully set forth herein. A technique that may be used to configure devices in a daisy chain cascade is described in commonly owned U.S. patent application Ser. No. 11/496,728, titled "Daisy Chain Cascading Devices" which is also hereby incorporated by reference in its entirety as though fully set forth herein.

Figure 2:
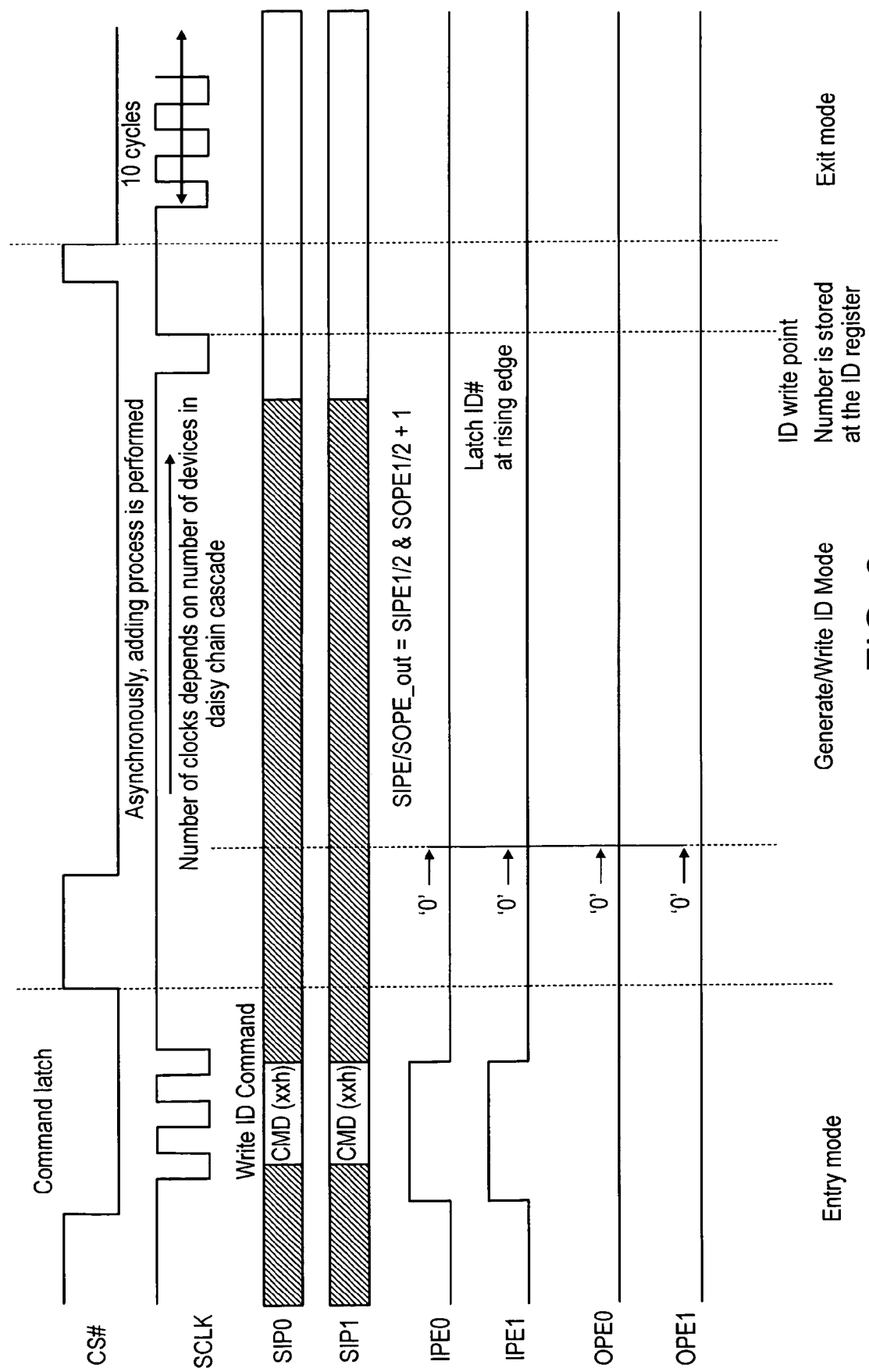
FIG. 2 is a timing diagram illustrating the establishment of identifiers (IDs) for devices coupled in a daisy chain cascade arrangement.

In accordance with techniques described herein, the generation of IDs for the devices 110 is initiated with a "write ID" command that is input to an SIP input of each device in the daisy chain cascade. Specifically, a write ID command is input to an SIP input of device 110a which processes the command including entering a special write ID mode. In addition, device 110a outputs the command at its SOP1 output to device 110b. The command exits device 10a and enters 110b via its SIP1 input, which processes it and outputs the command via its SOP outputs. This process is repeated by each device 110 in the daisy chain cascade. After each device has received the command, CS# is toggled and the devices generate an ID, as well be described further below. Afterwards, CS# is toggled again to cause the devices to exit the write ID mode. FIG. 2 is a timing diagram that illustrates these concepts for generating a 4-bit ID for the devices 110 illustrated in FIG. 1.

Referring to FIG. 2, at an "entry mode" portion of the timing diagram, CS# is asserted to select the devices 110. An IPE signal is fed to the first device's IPE0 and IPE1 inputs to enable commands to be input to the device's SIP0 and SIP1 inputs, respectively. Write ID commands are then input to the device's SIP0 or SIP1 inputs.

After the command has been input to each device 110 in the daisy chain cascade, CS# is toggled. This causes the devices 110 to enter a "generate/write ID mode". In this mode, each device 110 continually (and thus asynchronously from the clock signal SCLK) acquires the state of the IPE0, IPE1, OPE0 and OPE1 inputs, which is a first value that is input to the device 110. The device 110 then uses this first value to generate a second value asynchronously. The second value is output in parallel via the device's IPEQ1, IPEQ2, OPEQ1 and OPEQ2 outputs and transferred, asynchronously, to the next device's IPE0, IPE1, OPE0 and OPE1 inputs, respectively. This process is repeated for a period of time sufficient for a generated value to transfer to the last device in the daisy chain.

Note that the amount of time the devices are in generate/write ID mode depends on the number of devices in the daisy chain and the time it takes for the last device to generate its ID from a generated ID output from the second-to-last device in the daisy chain cascade. In other words, the amount of time spent in the generate/write ID mode should be sufficient to enable the first device to generate an ID and output the ID to the next device, the next device to acquire this generated ID from the first device, generate an ID based on the acquired ID and output its generated ID to the next device and so on until the last device in the daisy chain cascade has generated an ID from an ID generated by the second-to-last device and acquired from that device.

After the period of time has elapsed, the ID for each device 110 is established by placing the acquired state of the IPE0, IPE1, OPE0 and OPE1 inputs into the devices' ID register. The state of the IPE0, IPE1, OPE0 and OPE1 is illustratively used to establish a device ID for the device by placing the state in the device's ID register at a clock transition just prior to toggling CS# to enter exit mode. After the IDs have been placed in the devices' ID registers, CS# is toggled again to cause the devices 110 to enter an "exit mode". Here, each device 110 performs the necessary operations needed to exit the write ID command state.

For example, referring to FIGS. 1 and 2, assume a write ID command is input to the SIP1 or SIP2 inputs of device 110a. Device 10a processes the command including transferring the command to device 110b via SOP1 and SOP2. This processing is repeated at devices 110b through 110d. After sufficient time has elapsed for device 110d to receive and process the command, CS# is toggled to cause the devices 110 to enter generate/write ID mode. Each device 110 acquires the state of its IPE1, IPE2, OPE1 and OPE2 inputs and uses this state to generate a value. The device 110 outputs the generated value at its IPEQ1, IPEQ2, OPE1 and OPE2 outputs. Thus, for example, if the acquired state of the device's IPE1, IPE2, OPE1 and OPE2 inputs is a binary value of b'0000' the device 10a uses this value to generate a value that is output via its IPEQ1, IPEQ2, OPEQ1 and OPEQ2 outputs to device 110b which is the next device in the daisy chain cascade. The outputted value establishes the state of inputs IPE1, IPE2, OPE1 and OPE2 for device 110b (e.g., b'0001'). Device 110b acquires this state (e.g., b'0001'), uses this acquired state to generate a value (e.g., b'0010') and outputs the generated value at its IPEQ1, IPEQ2, OPEQ1 and OPEQ2 outputs to device 110c and so on. After sufficient time has elapsed, each device 110 places the acquired state of the IPE1, IPE2, OPE1 and OPE2 inputs into its device's ID register. CS# toggles again and each device 110 enters exit mode. Afterwards, the devices 110 exit the exit mode and the write ID command is considered to have completed.

In FIG. 1, four inputs (i.e., IPE0, IPE1, OPE0 and OPE1) and four outputs (i.e., IPEQ0, IPEQ1, OPEQ0 and OPEQ1) are used to input and output a four-bit device ID to and from a device 110, respectively. This acts to limit the number of devices that may comprise the daisy chain arrangement to 16. By involving more inputs and outputs on the device, however, the above described concepts may be expanded to support a greater number of devices.

Note that a device's ID register is used to hold a device ID associated with the device 110. The device ID is used to determine if certain information (e.g., a command) that is input to the device 110 is directed to the device 110. Illustratively, the device 110 determines if the information is directed to it by comparing the contents of the ID register to a device ID contained in the information. If the two match, the device 110 assumes the information is directed to it. Otherwise, if the two do not match, the device 110 ignores the information.

Figure 3A:
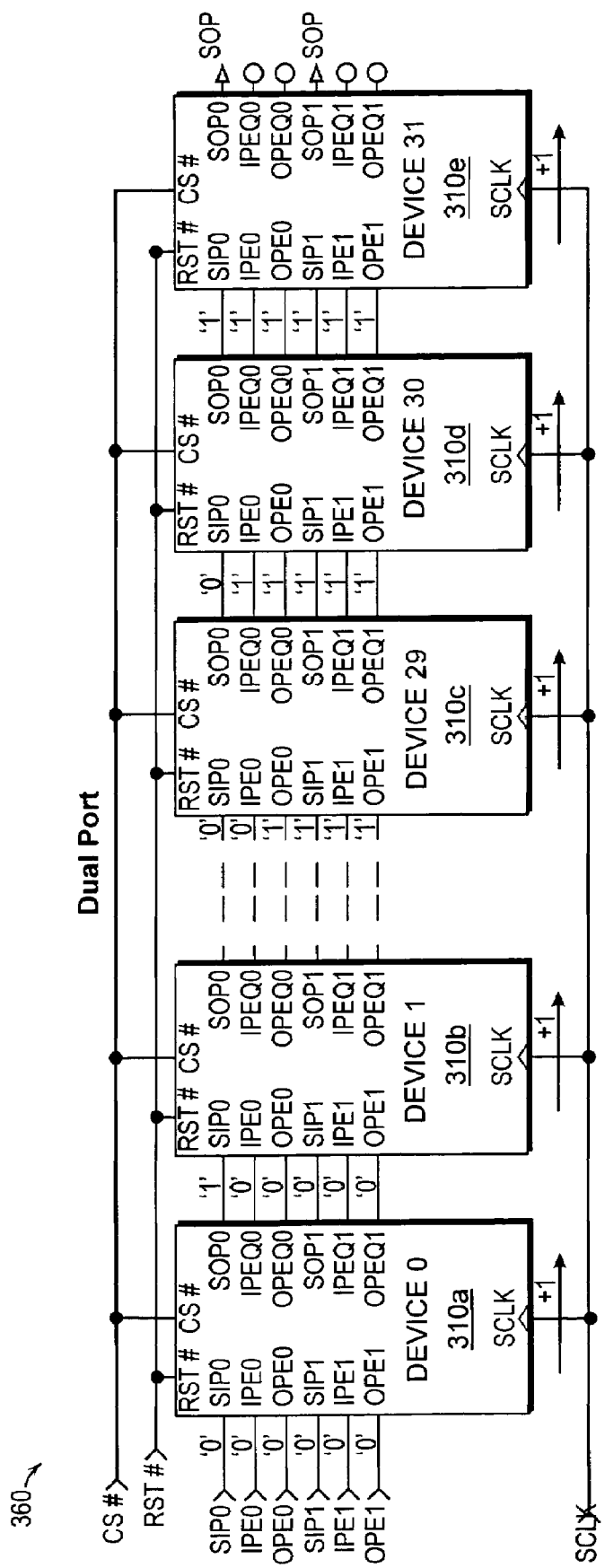
FIGS. 3A-B are high-level block diagrams of a daisy chain cascade arrangement comprising dual port devices and a daisy chain cascade arrangement comprising single port devices, respectively, that may be used with the techniques described herein.
Figure 3B:
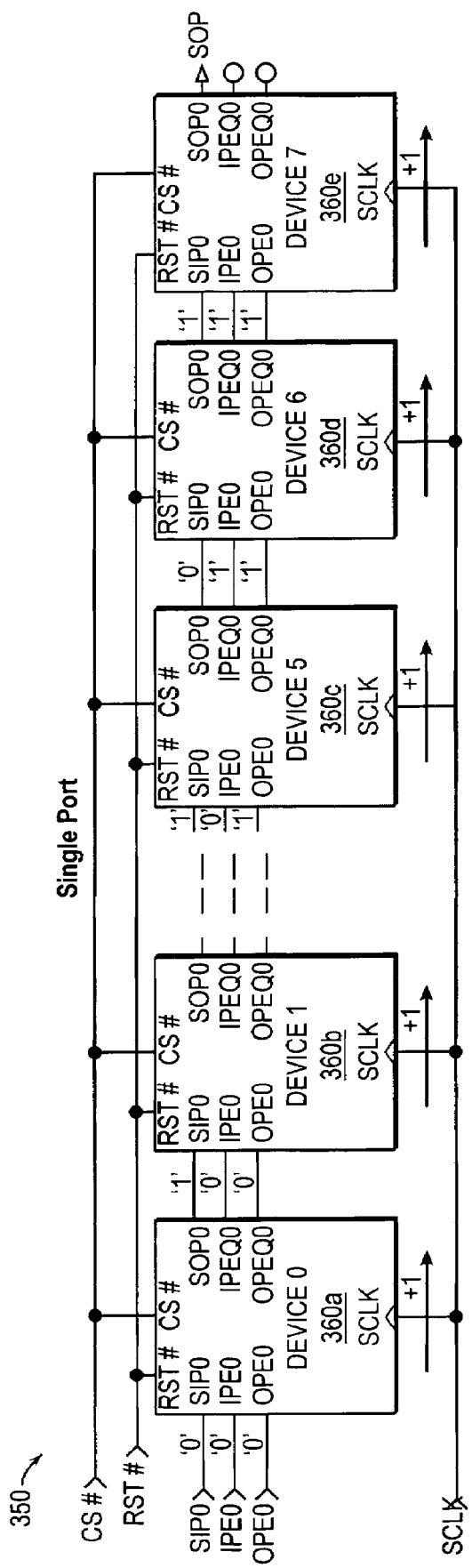

FIGS. 3A-B are high-level block diagrams of a daisy chain cascade arrangement comprising dual port devices and a daisy chain cascade arrangement comprising single port devices, respectively, that are configured to generate an ID in accordance with the techniques described herein. Referring to FIG. 3A, in the arrangement of dual port devices 300, each device 310 employs six inputs and six outputs to generate the device ID. This allows a six bit ID to be generated thus supporting a daisy chain cascade arrangement of up to 64 devices 310. Here, the SIP0, IPE0, OPE0, SIP1, IPE1 and OPE1 inputs are used to input values to the device 310 and the SOP0, IPEQ0, OPEQ0, SOP1, IPEQ1 and OPEQ1 outputs are used to output generated values from the devices 310.

Referring to FIG. 3B, in the arrangement of single port devices 350, each device 360 uses the SIP0, IPE0 and OPE0 inputs to input a value into the device 360 and the SOP0, IPEQ0 and OPEQ0 outputs to output the generated ID from the device 360. This allows a three bit ID to be generated thus supporting a daisy chain cascade arrangement of up to 8 devices.

The SCLK and CS# inputs in both arrangements are configured as described above to provide a clock and chip enable, respectively, to the devices. The devices also include an RST# input. This input is used to input a reset signal to the devices to reset the state of the device IDs contained in the devices to zero.

Figure 4:
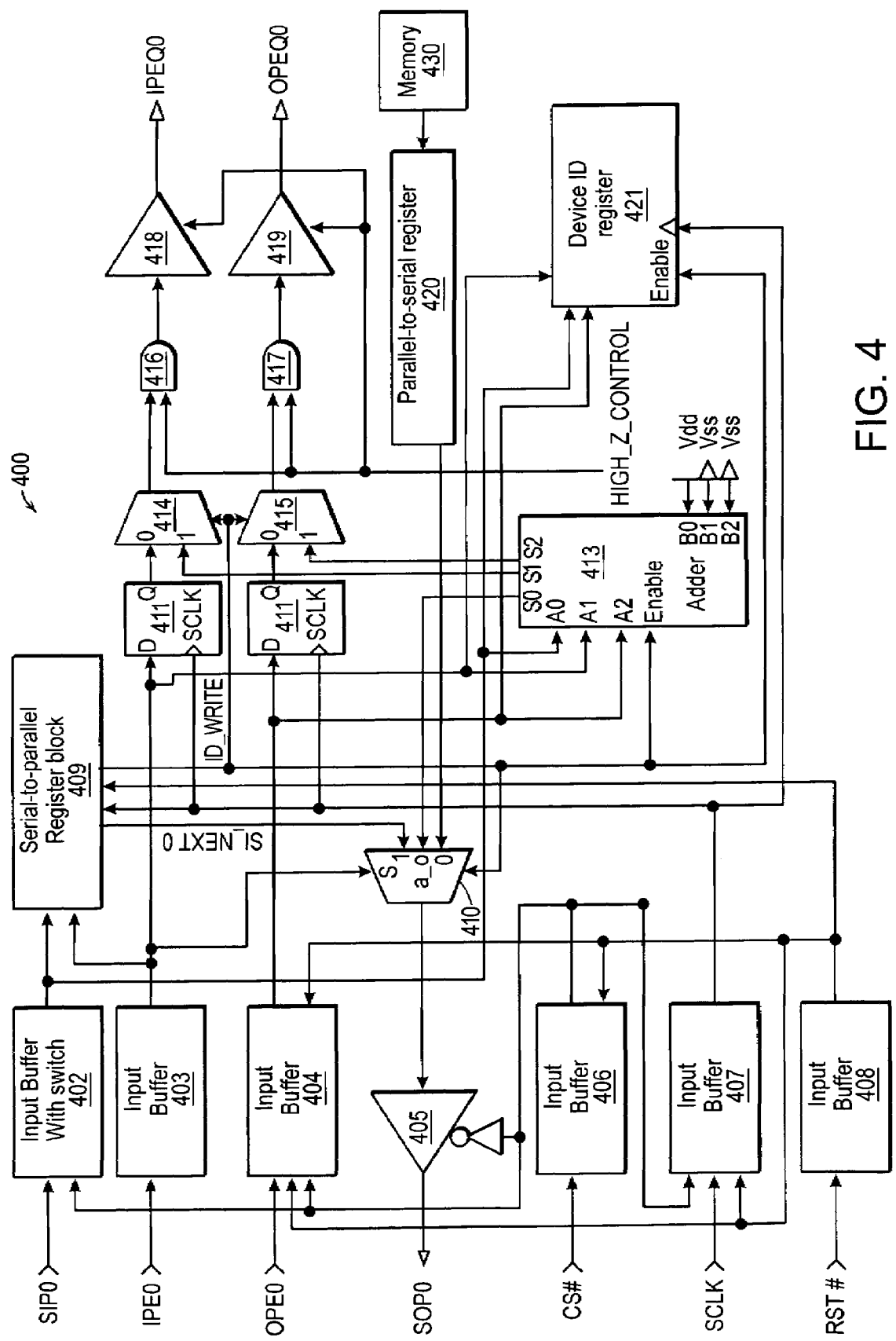
FIG. 4 is a block diagram of exemplary circuitry that may be used to establish IDs for single port devices in accordance with the techniques described herein.

FIG. 4 is a block diagram of circuitry 400 that may be used to input a first value to a single port device, establish an ID for the device based on the first value, generate a second value, and output the second value from the device in accordance with the techniques described herein. Circuitry 400 comprises input buffers 402, 403, 404, 406, 407 and 408, serial-to-parallel register block 409, selectors 410, 414 and 415, latches 411 and 412, gates 416 and 417, output buffers 405, 418 and 419, a parallel to serial register 420, a device ID register 421, adder 413 and memory 430.

Input buffers 406, 407 and 408 are conventional buffers used to input CS#, SCLK and RST# signals into the device. The state of input signals that are illustratively used to define the first value are input into the device via input circuitry comprising input buffers 402, 403, and 404. These buffers are conventional buffers configured to buffer SIP, IPE and OPE signals, respectively, that are fed to the device at the device's SIP0, IPE0 and OPE0. Note that these inputs may be used to the device to input other information (e.g., commands, control signals) to the device when the device is not operating in a generate/write ID mode. The generated second value is output from the device via output circuitry comprising output buffers 405, 418 and 419. These buffers are conventional buffers configured to output SOP, IPEQ and OPEQ signals, respectively, from the device at the device's SOP0, IPEQ0 and OPEQ0 outputs, respectively. Note that these output buffers may be used to output other information from the device when the device is not operating in a generate/write ID mode.

SCLK is a clock signal that is input to the device via input buffer 407. SCLK is used to, inter alia, serially clock information to and from the device. Command strings containing commands are serially clocked into the device via the SIP0 input. The command strings are output from the device to the next device in the daisy chain cascade via the device's SIP0 output.

RST# is a signal that is used to reset the device ID contained in the device's device ID register 421. RST# is input to the device via input buffer 408. Illustratively, asserting RST# causes the serial-to-parallel register block to generate a signal that is transmitted to the device ID register 421, thereby causing a reset operation into each register bit circuitry.

Serial-to-parallel register block 409 comprises circuitry configured to process commands input to the device via the SIP0 input and generate signals to control the operation of various portions of circuitry 400. Selector 410 is a conventional 3-to-1 multiplexer configured to output either the information input to the SIP0 input, data contained in memory 430 contained in the device or a bit output ("S0") from adder 413 to buffer 405. The signal that is output from selector 410 depends on the combination of the state of the IPE signal fed to the device and an ID_WRITE signal from the serial-to-parallel register block 409. The ID_WRITE signal is asserted after the serial-to-parallel register block 509 detects that a write ID command has been input to the device.

Latches 411 and 412 are conventional latches configured to latch the state of IPE and OPE signals input to the device, respectively. Selector 414 is a conventional 2-to-1 multiplexer configured to output either the latched state of IPE or a bit output ("S1") from adder 413 depending on the state of the ID_WRITE control signal from block 409. If ID_WRITE is asserted, the S1 bit output from adder 413 is output from the selector 414, otherwise, the latched state of IPE is output from the selector. Selector 415 is a conventional 2-to-1 multiplexer configured to output either the latched state of OPE or a bit output ("S2") from adder 413 depending on the ID_WRITE signal's state. If ID_WRITE is asserted, the selector 415 outputs the state of the S2 from adder 413, otherwise, the latched state of OPE is output from the selector 415.

Gates 416 and 417 are conventional logic AND gates configured to output the IPE and OPE signals to buffers 418 and 419, respectively, when the HIGH_Z_CONTROL signal is asserted. The HIGH_Z_CONTROL signal is used to control the operation of buffers 418 and 419. When HIGH_Z_CONTROL is not asserted (deasserted), the output of buffers 418 and 419 are in a high-impedance state meaning that a high-impedance is presented at the outputs. When HIGH_Z_CONTROL signal is asserted, the output of buffers 418 and 419 are at the state determined by the inputs to the buffers 418,419. Thus, assuming ID_WRITE is asserted, when HIGH_Z_CONTROL is asserted, the state of the S1 and S2 outputs of adder 413 are presented at the outputs of buffers 418 and 419, respectively. The HIGH_Z_CONTROL signal may be configured such that, for example, it is asserted at all times except when CS# is high.

Parallel-to-serial register 420 comprises circuitry configured to convert data read from memory 430 to a serial stream that is fed to selector 410. Device ID register 421 is storage configured to hold an ID for the device. Memory 430 is a conventional memory, such as a flash memory, configured to hold data input to the device. Parallel-to-serial register 420 is a conventional register configured to hold data read from the memory 430 that is to be output from the device.

A second value is generated by the device from a first value input to the device using generation circuitry which illustratively includes adder 413. Adder 413 is a conventional adder configured to generate the second value that is output from the device via the IPEQ0, OPEQ0 and SOP0 outputs from a first value that is input to the device via the SIP0, IPE0 and OPE0 inputs. The adder 413 is not clocked by the clock SCLK and, therefore, generates the second value asynchronously. The adder 413 comprises data inputs A0, A1, A2, B0, B1 and B2, an enable input and data outputs S0, S1 and S2. Inputs A0, A1 and A2 are configured to input the state of the device's SIP0, IPE0 and OPE0 inputs to the adder 413. Inputs B0, B1 and B2 are illustratively "hardwired" to a binary value of b'001' although other values may be used. The enable input is fed from the control signal ID_WRITE from block 409 and is asserted when a write ID command is processed by block 409.

Asserting the enable signal causes the adder 413 to add the state of the SIP0, IPE0 and OPE0 inputs with the value b'001' to produce a result that is output from the adder 513 at the adder's S0, S1 and S2 outputs. The result is output from the device at the SOP0, IPEQ0 and OPEQ0 outputs.

Operationally, CS# is asserted and fed into the device via input buffer 406 which distributes the asserted CS# signal to buffer 402, buffer 405 and buffer 407 to enable these buffers. The output of buffer 406 provides a clock (SCLK) to serial-to-parallel block 409, latches 411, 412 and device ID register 421. IPE is asserted and fed to serial-to-parallel block 409 via input buffer 403. A write ID command is serially clocked into the device at the SIP0 input using SCLK and fed via buffer 402 to serial-to-parallel register block 409 which processes the command. Block 409 generates an SI_NEXT0 signal to output the write ID command from the device at SOP0 via buffer 405 during the entry mode phase of the write ID command. The outputted write ID command is fed to the next device in the daisy chain cascade which processes the command, as described above, and outputs the command to the next device and so on. In addition, the states of IPE and OPE signals present at the IPE0 and OPE0 inputs, respectively, are placed in latches 411 and 412, respectively. The latched state is output, asynchronously, from the device at IPEQ0 and OPEQ0 via selectors 414 and 415, gates 416 and 417, and buffers 418 and 419, respectively. These signals are likewise propagated through all of the devices in the daisy chain cascade, as described above.

While in the generate/write ID mode of the write ID command, the state of the SEP0, IPE0 and OPE0 inputs (first value) are fed to the A0, A1 and A2 inputs, respectively, of adder 413. An asserted ID_WRITE control signal, generated by block 409 as a result of processing the write ID command, enables the adder 413 which causes a binary value of b'001' at inputs B0, B1 and B2 to be added to the value input to inputs A0, A1 and A2 to produce a result (second value). This result is output from the adder 413 at outputs S0, S1 and S2 and fed to selectors 410, 414 and 415, respectively. The asserted ID_WRITE control signal is fed to these selectors 410, 414 and 415 to cause the selectors to output the result to buffer 405 and, buffers 418 and 419 via gates 416 and 417. The outputs of buffers 405, 418 and 419 are output from the device at outputs SOP, IPEQ and OPEQ, respectively. Meanwhile, the asserted ID_WRITE control signal is fed to the device ID register 421 to enable the register. The state of the SIP, IPE and OPE inputs is used to establish the device ID for the device and placed in the device ID register 421 at a transition of SCLK just prior to the toggling of CS#. CS# is toggled and, the device enters an exit mode and exits the write ID command, as described above.

Figure 5:
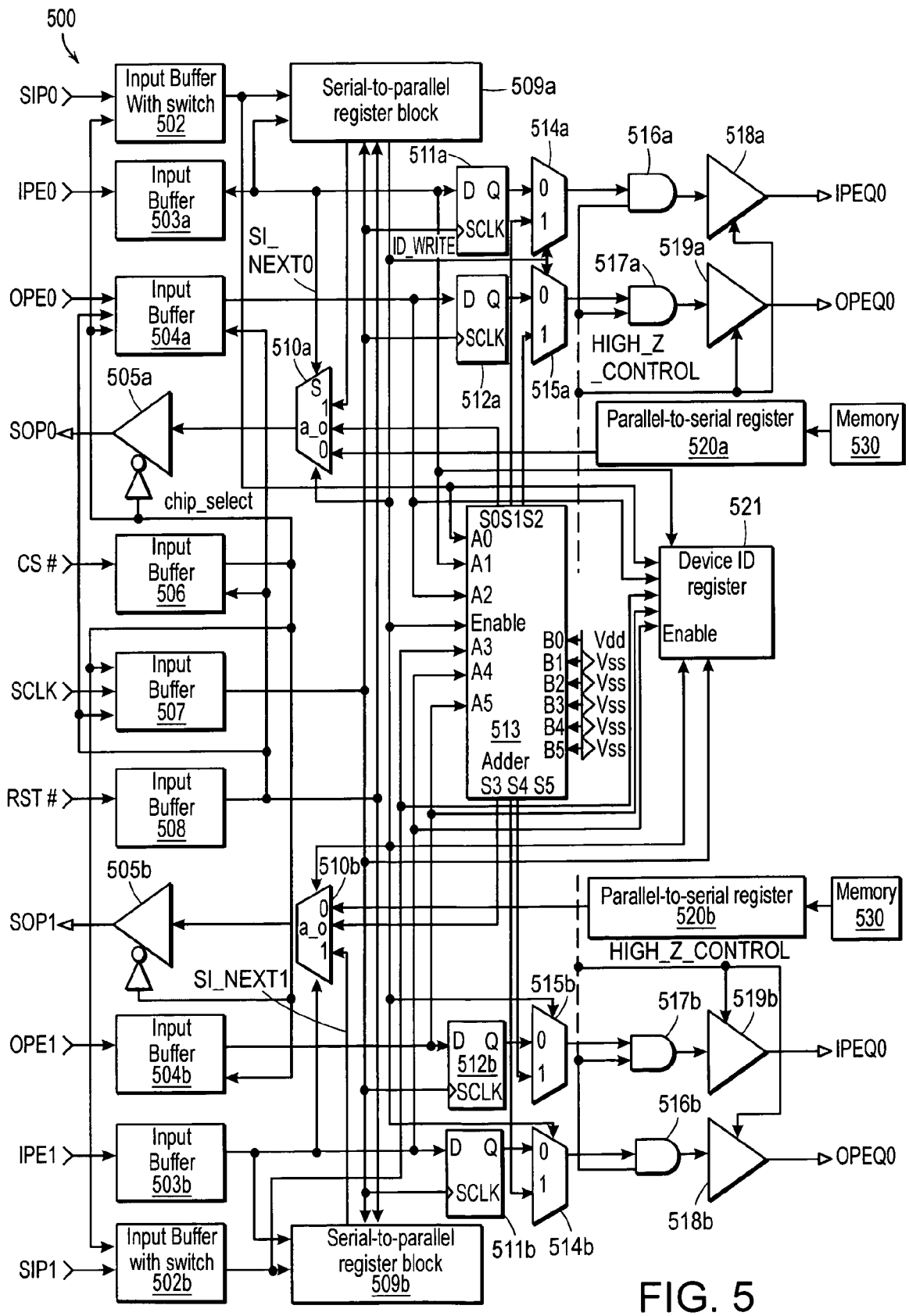
FIG. 5 is a block diagram of exemplary circuitry that may be used to establish IDs for dual port devices in accordance with the techniques described herein.

FIG. 5 is a block diagram of generation circuitry 500 for a dual port device. Circuitry 500 comprises input buffers 502a-b, 503a-b, 504a-b, 506, 507 and 508, output buffers 518a-b, 519a-b and 505a-b, serial-to-parallel register blocks 509a-b, selectors 510a-b, 514a-b and 515a-b, latches 511a-b and 512a-b, gates 516a-b and 517a-b, adder 513, parallel-to-serial registers 520a-b, device ID register 521 and memory 530. Input buffers 502a-b, 503a-b, 504a-b, 506, 507 and 508 are identical to the above-described input buffers 402, 403, 404, 406, 407 and 408, respectively. Output buffers 518a-b, 519a-b and 505a-b are identical to the above-described output buffers 418, 419 and 405, respectively. Selectors 510a-b, 514a-b, 515a-b are identical to the above-described selectors 410, 414 and 415, respectively. Latches 511a-b and 512a-b are identical to the above-described latches 411 and 412. Gates 516a-b and 517a-b are identical to gates 416 and 417, respectively. Serial-to-parallel registers 509a-b are identical to the above-described serial-to-parallel register 409. Parallel-to-serial registers 520a-b are identical to the above-described parallel-to-serial register 420. Memory 530 is identical to memory 430 as described above except that the memory 530 may be configured as a dual ported memory which enables two operations (one from each port) to be performed on the memory simultaneously.

Adder 513 is identical to the above-described adder 413 except that adder 513 has a set of six "A" inputs, a set of six "B" inputs and a set of six outputs. The inputs A0, A1, A2, A3, A4 and A5 are fed with signals input to the device at SIP0, IPE0, OPE0, SIP1, IPE1 and OPE1 respectively. Note that SIP0, IPE0 and OPE0 are the SIP, IPE and OPE inputs for port 0 of the device and, SIP1, IPE1 and OPE1 are the SIP, IPE and OPE inputs for port 1 of the device. The "B" inputs (B0-B5) are "hardwired" to a binary value of b'000001' to cause the adder 513 to produce a result that is one plus the state of the signals input to the device at the SIP0, IPE0, OPE0, SIP, IPE1 and OPE1.

Device ID register 521 is identical to the above-described device ID register 421 except that the state of the SIP0, IPE0, OPE0, SIP1, IPE1 and OPE1 inputs are used to form the ID that is placed in the register 521. Illustratively, register 521 is 6-bit register configured to maintain a 6-bit device ID.

RST#, SCLK and CS# signals are input to the device via buffers 508, 507 and 506, respectively. The RST# signal is used to reset the device, as described above. The SCLK signal provides a clock that is used by the device, as described above. Likewise, the CS# signal is used to select the device, as described above.

Figure 6:
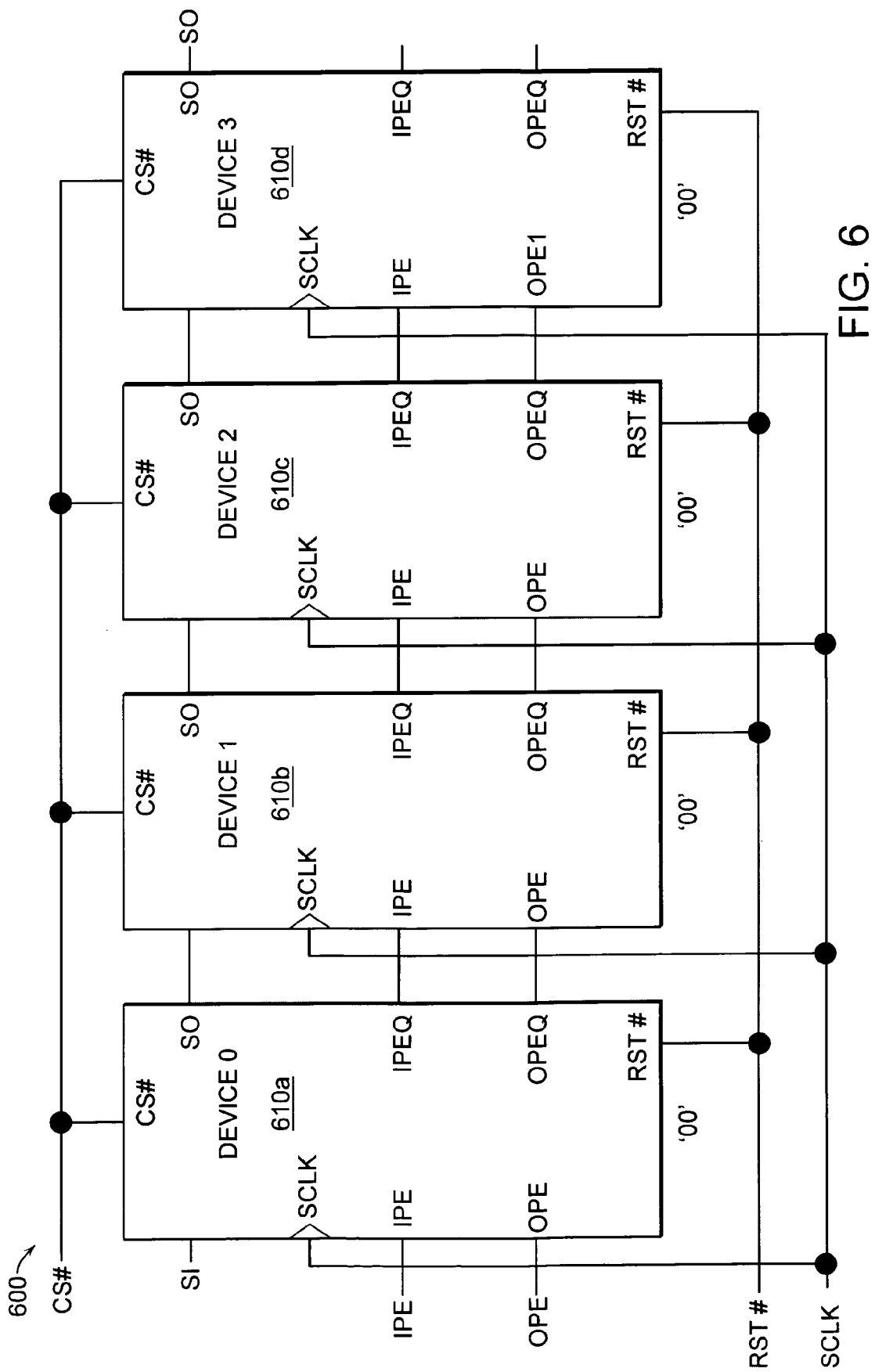
FIG. 6 is a high-level block diagram of a daisy chain cascade arrangement of single port devices illustrating a state of the devices' IDs at a reset state.

FIG. 6 is a high-level block diagram of a daisy chain cascade arrangement 600 of single port devices 610a-d illustrating a state of the devices' IDs at a reset state. Referring to FIG. 6, when RST# is asserted, each device 610 is reset as described above with reference to FIG. 4. Asserting RST# initializes the state of the device IDs for the devices 610a-d to zero.

Figure 7:
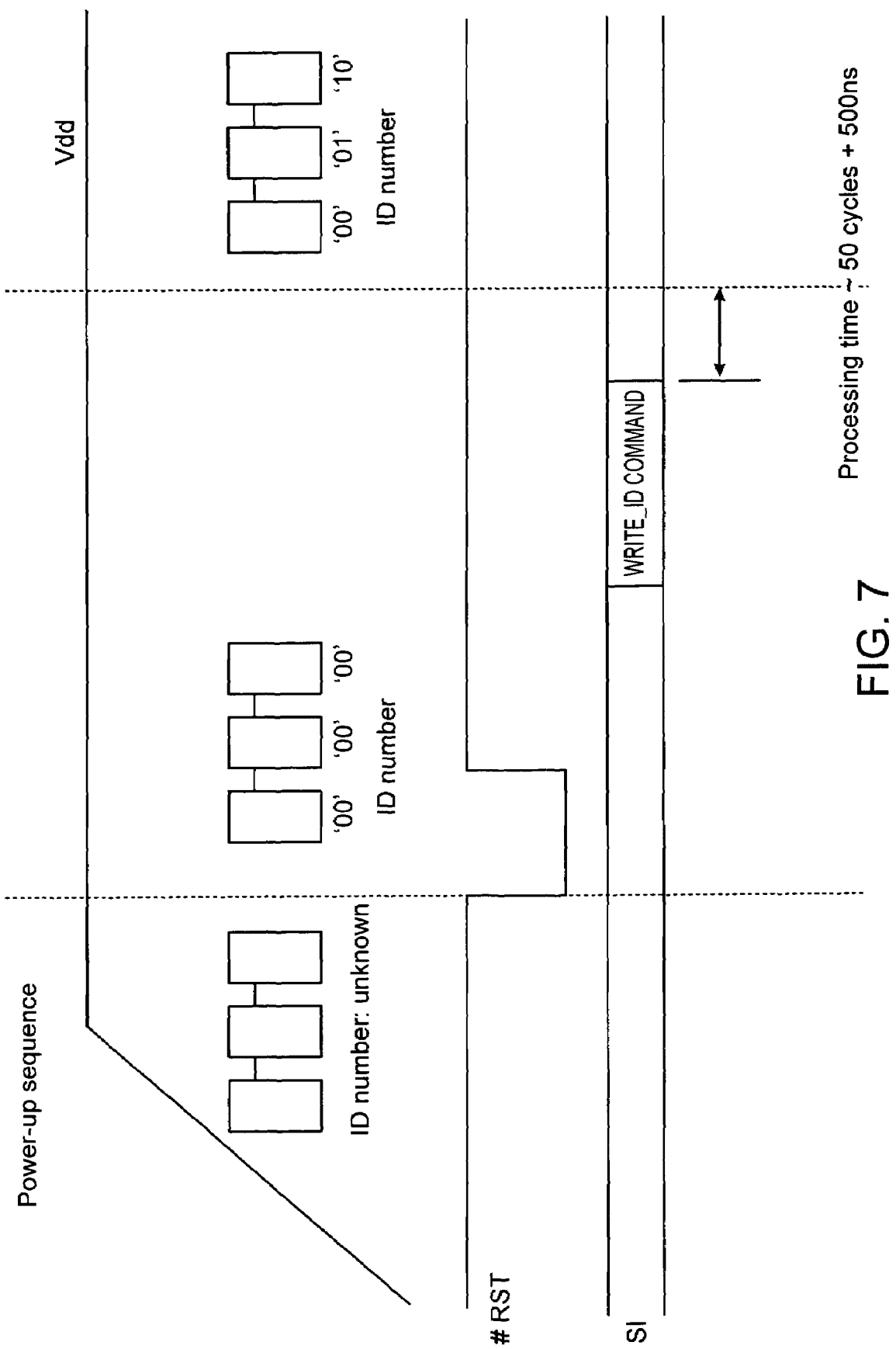
FIG. 7 is a timing diagram illustrating timing involved with establishing the device IDs of devices during a power-up sequence.

FIG. 7 is a timing diagram illustrating timing involved with establishing the device IDs of devices during a power-up sequence. Referring to FIG. 7, as power to the devices approaches Vdd, the device IDs contained in the devices are in an unknown state. After the power reaches Vdd, RST# is asserted to reset the device IDs for each device to a known state (e.g., a binary value b'00'), as described above. After RST# is de-asserted, a write ID command is input to the devices, as described above, to initiate the above-described process of establishing a device ID for each device. After the write ID command has been processed, the devices contain their appropriate device ID.

Figure 8A:
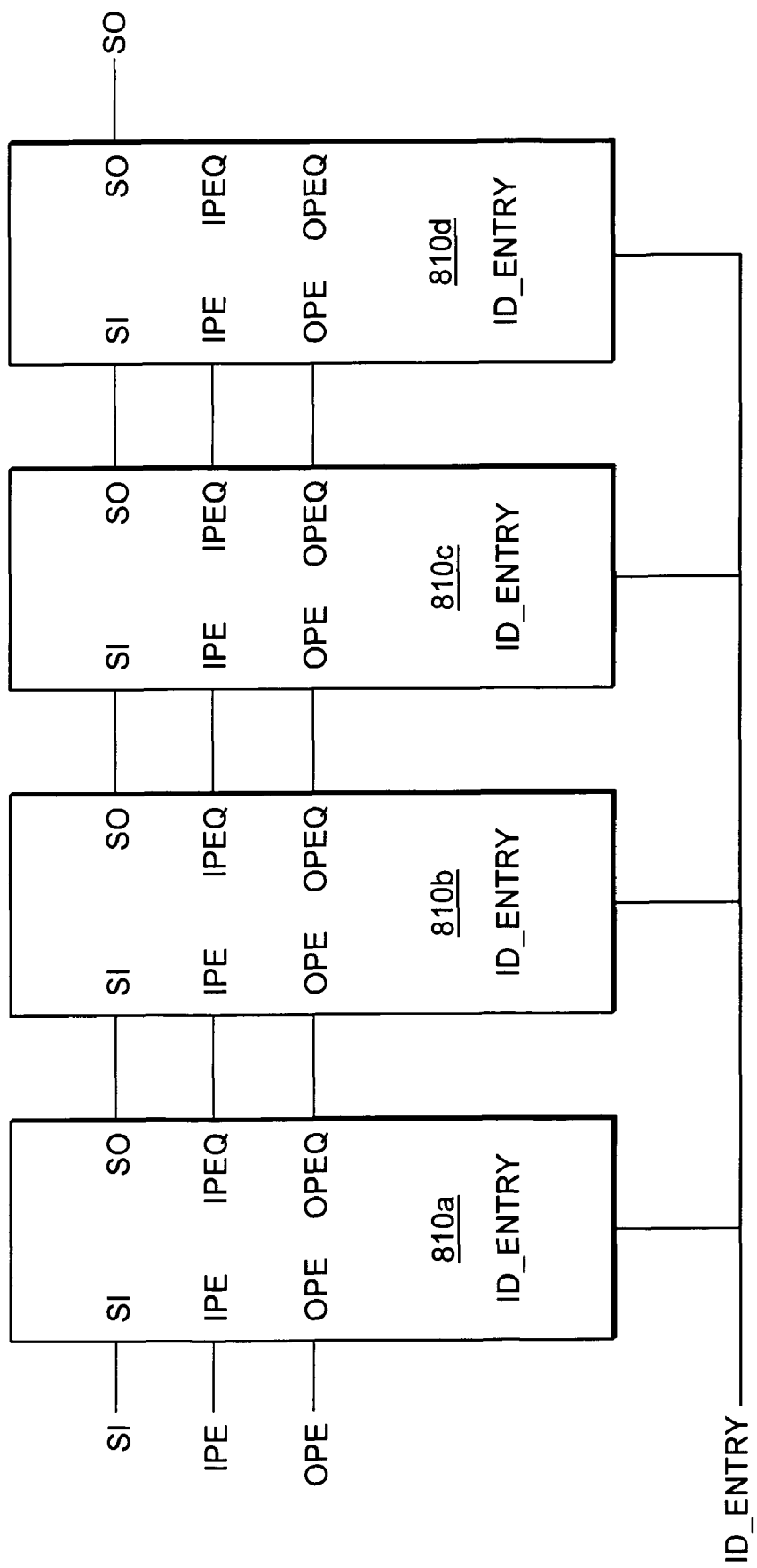
FIGS. 8A-C are diagrams illustrating the establishment of IDs for devices using a control signal input to the devices to control the ID establishment process.
Figure 8B:
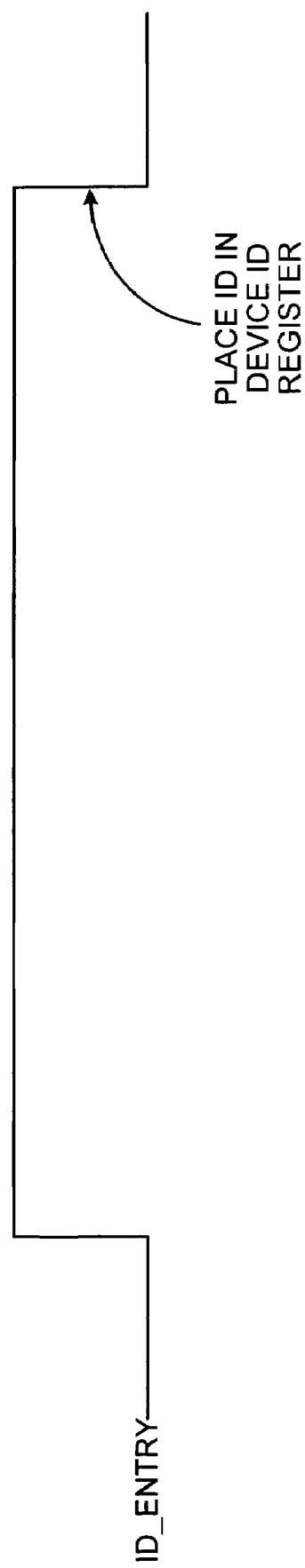
Figure 8C:
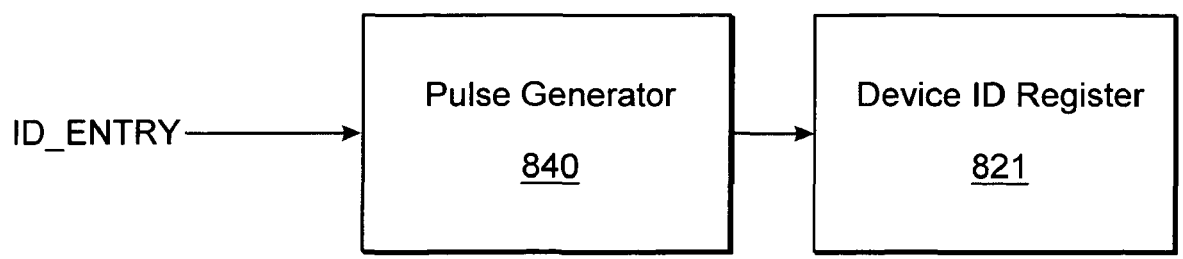

FIGS. 8A-C illustrate various aspects of an alternative technique that may be used to control the write ID process for exemplary devices 810 configured in a daisy chain cascade arrangement. Referring to FIG. 8A, in this example, each device 810 in the arrangement has SI, IPE and OPE inputs which are identical to the SI, IPE and OPE inputs described above and, SO, IPEQ and OPEQ outputs which are identical to the above-described SO, IPEQ and OPEQ outputs. In addition, each device 810 has an ID_ENTRY input which is configured to input an ID_ENTRY signal to the device 810.

Referring to FIG. 8B, asserting the ID_ENTRY signal illustratively causes the devices to enter the generate/write ID mode described above and stay in this mode until the ID_ENTRY signal is no longer asserted. After entering this mode, each device acquires the state of the SI, IPE and OPE inputs which comprise a first value that input to the device. The devices then generate a second value from the first value and output the generated second value at their SO, IPEQ and OPEQ outputs, as described above. The first value is placed in the device's device ID register when the ID_ENTRY signal transitions from the asserted state to the de-asserted state. As illustrated in FIG. 8C, a pulse generator 840 may be used to generate a pulse from the transition of the ID_ENTRY signal which is used to place the first value in the device's device ID register.

Figure 9:
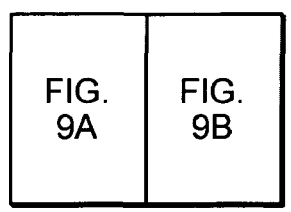
FIG. 9 is a block diagram of exemplary circuitry that controls the operation of the generation/write ID mode for a device using a control signal that is input to the device.
Figure 9A:
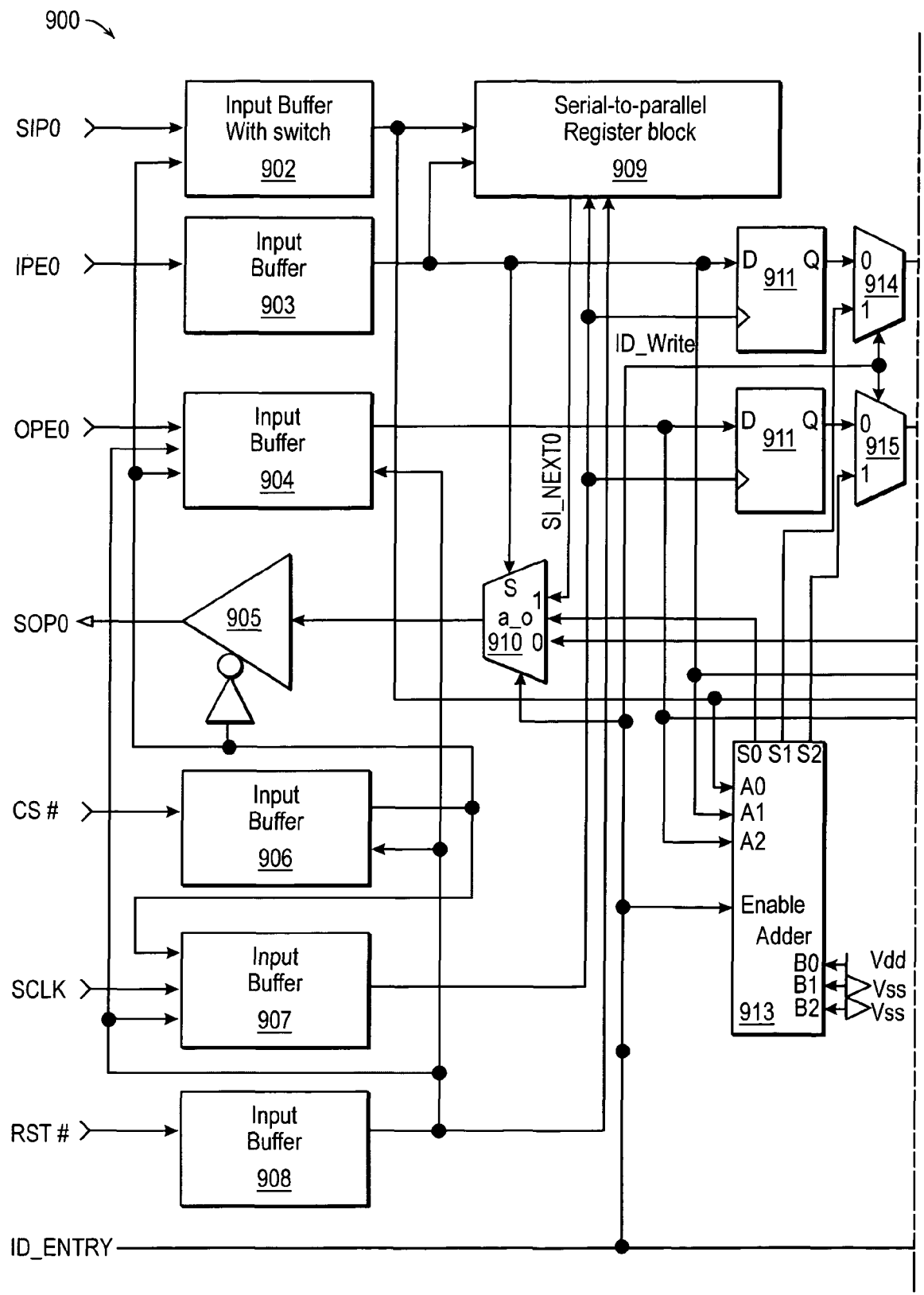
Figure 9B:
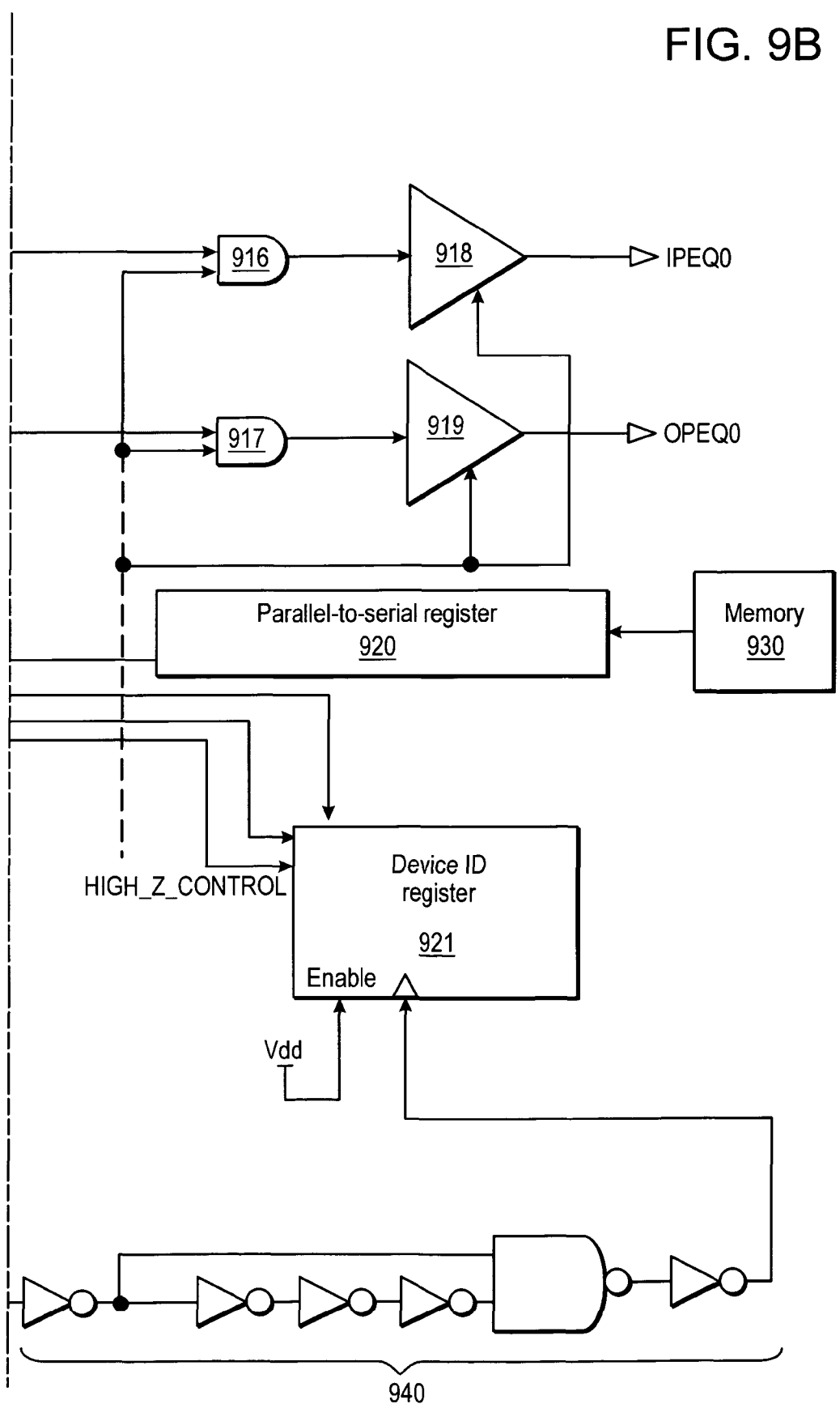

FIG. 9 is a block diagram of exemplary circuitry 900 that controls the operation of the generation/write ID mode for a device using a control signal (e.g., ID_ENTRY) that is input to the device. Circuitry 900 comprises input buffers 902, 903, 904, 906, 907 and 908, a serial-to-parallel register block 909, selectors 910, 914 and 915, latches 911 and 912, gates 916 and 917, output buffers 905, 918 and 919, parallel-to-serial register 920, device ID register 921, adder 913, pulse generator 940 and memory 930. Buffers 902, 903, 904, 906, 907 and 908, serial-to-parallel register block 909, selectors 910, 914 and 915, latches 911 and 912, gates 916 and 917, output buffers 905, 918 and 919, parallel-to-serial register 920, device ID register 921, adder 913 and memory 930 are identical to the above-described input buffers 402, 403, 404, 406, 407 and 408, serial-to-parallel register block 409, selectors 410, 414 and 415, latches 411 and 412, gates 416 and 417, output buffers 405, 418 and 419, and parallel-to-serial register 420, device ID register 421, adder 413 and memory 430, respectively, except that selectors 910, 914 and 915, adder 913 and device ID register 921 are enabled by the ID_ENTRY signal input at an ID_ENTRY input rather than with a ID_WRITE signal that is generated from a write ID command and the clock input to the device ID register 921 is fed with the output of pulse generator 940 as opposed to the output of the SCLK input buffer.

Pulse generator 940 comprises circuitry configured to generate a pulse from the ID_ENTRY signal that is input to the device via the ID_ENTRY input. Specifically, when the ID_ENTRY signal transitions from an asserted state to a non-asserted state, pulse generator 940 generates a pulse which is fed to the device ID register 921 to cause the states of the IPE0, SIP0 and OPE0 inputs to be placed in the device ID register 921.

Operationally, ID_ENTRY is asserted and fed to the device via the ID_ENTRY input. Adder 913 is enabled causing a predetermined value at the B0-B2 inputs (e.g., a binary value of b'001') to be added to the state of the SIP0, IPE0 and OPE0 inputs. The result is output from the adder and fed to selectors 910, 914 and 915. The asserted ID_ENTRY signal causes these selectors to output the result at outputs SOP0, IPEQ0 and OPEQ0, respectively. Meanwhile, the asserted ID_ENTRY signal causes the device ID register 921 to be enabled. On the transitioning of the ID_ENTRY signal from an asserted state to a deasserted state, pulse generator 940 generates a pulse which is fed to the device ID register 921 to cause it to place the state of the SIP0, IPE0 and OPE0 inputs in the device ID register 921.

For example, assume a binary value of b'000' is input at the SIP0, IPE0 and OPE0 inputs and that the predetermined value added to the state of the inputs is b'001'. Now assume ID_ENTRY is asserted. The binary value is fed to the A0-A2 inputs of the adder 913 which adds it to the binary value b'001' present at its B0-B2 inputs to produce a result (i.e., b'001') which is output from the adder at its output S0-S2. The result is fed to selectors 910, 914 and 915. In addition, the asserted ID_ENTRY signal is fed to these selectors to cause them to output the result to output buffers 905, 918 and 919, respectively. Buffers 905, 918 and 919 output the result from the device at outputs SOP0, IPEQ0 and OPEQ0, respectively. ID_ENTRY is transitioned from an asserted state to a non-asserted state. The transition causes the pulse generator 940 to generate a pulse. This pulse is fed to the device ID register 921 and causes the register 921 to latch the state of the inputs (i.e., b'000') and establish a device ID of b'000' for the device.

Figure 10:
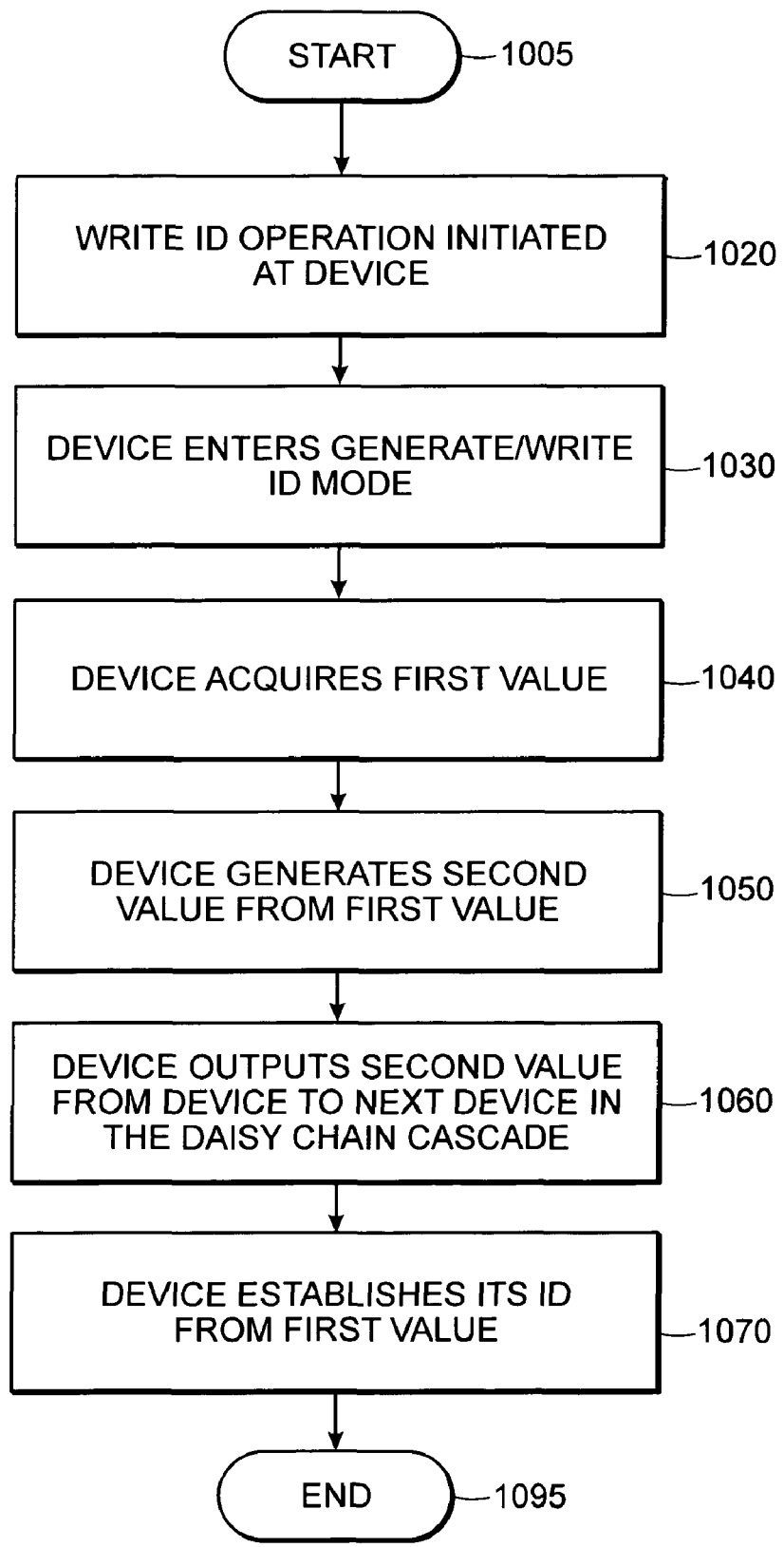
FIG. 10 is a flow chart of a sequence of steps that may be used to establish IDs for devices in a daisy chain cascade in accordance with the techniques described herein.

FIG. 10 is a flow chart of a sequence of steps that may be used to establish an ID for a device in a daisy chain cascade in accordance with the techniques described herein. The sequence begins at step 1005 and proceeds to step 1020 where a write ID operation is initiated on the device. This operation may be initiated, e.g., by inputting a write ID command into the device, as described above, or inputting an asserted control signal (e.g., ID_WRITE signal) into the device, also as described above. At step 1030, the device enters a generate/write ID mode as described above. While in this mode, at step 1040, the device acquires a first value illustratively by acquiring a state of one or more inputs (e.g., the SIP, IPE and OPE inputs) to the device. The state of the one or more inputs relates to the logical state of signals present on these inputs. For example, if the state of the inputs that are acquired include the SIP, IPE and OPE inputs of the device where the SIP input is the most significant bit (MSB) and the OPE input is the least significant bit (LSB) and the signals present on these inputs are each a logical zero (e.g., low), the acquired state is a binary value of b'000'. Likewise, if the signal present on the OPE input is a logical one (e.g., high) and the signals present on the SIP and IPE inputs are a logical zero, the acquired state is a binary value of b'001'.

Next, at step 1050, a second value is generated from the first value. This second value may be generated by adding a predetermined value to the first value, as described above. At step 1060, the second value is then output from the device via one or more of the device's outputs to a next device in the daisy chain cascade. The device, at step 1070, establishes its ID from the first value. Illustratively, the device establishes its ID by placing the acquired state of the inputs in a device ID register contained in the device. The sequence ends at step 1095.

For example, referring to FIGS. 3, 5 and 10, assume IDs are to be established for devices 310a-e. A write ID operation is initiated at each of the devices 310 (step 1020). Illustratively, this operation is initiated by issuing a write ID command to the devices 310a-e (step 1020). Specifically, a CS# signal is asserted at the CS# input of devices 310a-e. Buffer 506 receives the signal and outputs it to input buffers 502a-b and 504a-b to enable these buffers. IPE is then asserted at the IPE0 and IPE1 inputs of device 310a. The IPE signal is received by buffers 503a-b and transferred to serial-to-parallel register blocks 509a-b to enable these blocks as well as to latches 511a-b where the signals are latched. Since ID_WRITE is not asserted, selectors 514a-b output the latched state of IPE to gates 516a-b. The signal passes through gates 516a-b to output buffers 518a-b and is output from device 310a at the IPEQ0 and IPEQ1 outputs to the next device (i.e., 310b) in the daisy chain cascade. The above sequence is repeated at devices 310b-e to propagate the IPE signal through these devices 310.

While IPE is asserted, a write ID command is then fed to serial inputs SIP0 and SIP1 at device 310a. The command is received at buffers 502a-b and fed to the serial-to-parallel register blocks 509a-b. The blocks 509a-b output the command to selectors 510a-b which are configured by the IPE signal to output the command from these selectors 510a-b to output buffers 505a-b. The output buffers 505a-b output the command from device 310a at the SOP0 and SOP1 outputs to the SIP0 and SIP1 inputs of the next device 310b in the daisy chain cascade. The command is latched by the serial-to-parallel register blocks 509a-b. This process is repeated by the other devices 310b-e in the daisy chain cascade to cause the command to be input and processed by these devices 310.

After the command has been input into all of the devices 310a-e in the daisy chain cascade, CS# is toggled and the devices enter the generate/write ID mode (step 1030). In this mode, a first value is input at each device 310 by acquiring the state of the SIP0, IPE0, OPE0, SIP1, IPE1 and OPE1 inputs of the device 310 (step 1040). Specifically, the state of the SIP0, IPE0, OPE0, SIP1, IPE1 and OPE1 inputs are illustratively acquired by buffers 502a-b, 503a-b and 504a-b. This acquired state is fed to the adder 513 and device ID register 521. Illustratively, for device 310a, a signal is applied to the SIP0, IPE0, OPE0, SIP5, IPE1 and OPE1 inputs by, e.g., a memory controller (not shown) to cause the state of these inputs to be zero.

The devices then generate a second value from the first value by illustratively adding a binary value of b'000001' to the state of the acquired inputs (step 1050). Specifically, serial-to-register block 509a generates an ID_WRITE signal and feeds the signal to adder 513 to enable the adder 513. Adder 513 adds a predetermined value (e.g., the binary value b'000001') to the acquired state fed to the adder 513 to produce a result which is the second value.

Each device 310 then outputs the second value to the next device 310 in the daisy chain cascade (step 1060). Specifically, the result from the adder 513 is fed to selectors 510a-b, 514a-b and 515a-b which are configured by the ID_WRITE signal to output the result from the selectors. The value output from selectors 610a-b is fed to buffer 505a-b, respectively, which outputs the value from the device 310 at the SOP0 and SOP1 outputs, as illustrated in FIG. 3. Likewise, the value output from selectors 514a-b and 515a-b is fed through gates 516a-b and 517a-b to buffers 518a-b and 519a-b, respectively, and output from the device 310 at the IPEQ0, OPEQ0, IPEQ1 and OPEQ1 outputs, as illustrated in FIG. 3 The outputted value is fed to the SIP0, IPE0, OPE0, SIP1, IPE1 and OPE1 of the next device 310 in the daisy chain cascade, as illustrated in FIG. 3 which repeats the above process to establish its ID. This process is repeated for all of the devices 310 in the daisy chain cascade.

The devices 310 then establish their ID based on the first value that was inputted to the devices. Specifically, the ID_WRITE signal is fed to the enable input of the device ID register 521 to enable the register. At the next clock cycle of SCLK, the acquired state fed to the register 521 is then placed in the register 521 to establish the ID for the device 310.

The above techniques are described as being used with single and dual port devices. It should be noted, however, the above-described techniques may be adapted to be used with devices comprising more than two ports.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of assigning an identifier (ID) for a memory device configured in a daisy chain cascade arrangement having a plurality of devices, the method comprising:
processing, at a first memory device in the daisy chain cascade arrangement, a command causing the first device to enter a mode for assigning an identifier;
asynchronously asserting an input to input a first value to the first memory device independent of a clock signal;
asynchronously producing a second value from the first value independent of a clock signal;
asynchronously asserting an output to output the second value from the first memory device to a second memory device in the daisy chain cascade arrangement independent of a clock signal, the output being configured to output control signals outside of the mode for assigning an identifier, the control signals being distinct from the first and second values; and
holding an ID established for the first memory device based on the first value.

2. A method as defined in claim 1 wherein inputting a first value to a first memory device includes acquiring a state of input of the first device.

3. A method as defined in claim 1 wherein holding an ID for the first memory device includes placing the first value in storage associated with the first memory device.

4. A method as defined in claim 3 wherein the storage is a device ID register for the first memory device.

5. A method as defined in claim 1 wherein producing the second value includes:
adding a predetermined value to the first value to generate the second value.

6. A memory device configured in a daisy chain cascade arrangement having a plurality of memory devices, the memory device comprising:
control circuitry configured to process a command causing the device to enter a mode for assigning an identifier;
input circuitry configured to input, asynchronously and independent of a clock signal, a first value into the memory device;
output circuitry configured to output, asynchronously and independent of a clock signal, a second value generated asynchronously and independent of a clock signal from the first value to a second memory device in the daisy chain cascade via one or more outputs of the device, the output circuitry asserting an output configured to output control signals outside of the mode for assigning an identifier, the control signals being distinct from the first and second values; and
holding circuitry configured to hold an identifier established (ID) for the memory device based on the first value.

7. A memory device as defined in claim 6 wherein the input circuitry further comprises circuitry configured to acquire a state of input of the first memory device.

8. A memory device as defined in claim 6 wherein the holding circuitry comprises storage associated with the memory device, the storage configured to store the established ID for the device.

9. A memory device as defined in claim 6 further comprising:
adder circuitry configured to add a third value to the first value to generate the second value.

10. A device as defined in claim 9 wherein the third value is a predetermined value.

11. A device as defined in claim 6 wherein the output circuitry includes:
one or more output buffers configured to output the value to the second memory device in the daisy chain cascade.

12. A daisy chain cascade arrangement having a plurality of devices, the arrangement comprising:
a first memory device comprising:
control circuitry configured to process a command causing the first memory device to enter a mode for assigning an identifier;
input circuitry configured to input, asynchronously and independent of a clock signal, a first value into the first memory device;

producing circuitry configured to produce, asynchronously and independent of a clock signal, a second value from the first value;
output circuitry configured to output, asynchronously and independent of a clock signal, the second value to a second memory device, the output circuitry asserting an output configured to output control signals outside of the mode for assigning an identifier, the control signals being distinct from the first and second values; and
holding circuitry configured to hold a first identifier (ID) established for the first memory device, the first ID based on the first value; and a second memory device comprising:
control circuitry configured to process a command causing the second memory device to enter a mode for assigning an identifier;
input circuitry configured to input the second value into the second memory device;
producing circuitry configured to produce a third value from the second value;
output circuitry configured to output the third value to a third memory device, the output circuitry asserting an output configured to output control signals outside of the mode for assigning an identifier, the control signals being distinct from the first and second values; and
holding circuitry configured to hold a second identifier (ID) established for the second memory device, the second ID based on the second value.

13. A daisy chain cascade arrangement as defined in claim 12 wherein:
the input circuitry of the first device comprises circuitry for acquiring the state of input of the first memory device; and
the input circuitry of the second device comprises circuitry for acquiring the state of input of the second memory device.

14. A daisy chain cascade arrangement as defined in claim 12 wherein:
the holding circuitry of the first memory device comprises establishing circuitry for placing the first ID in storage associated with the first memory device; and
the holding circuitry of the second memory device comprises establishing circuitry for placing the first ID in storage associated with the second memory device.

15. A daisy chain cascade arrangement as defined in claim 12 wherein each of the first and second memory devices establishes the ID in response to an ID entry.

16. A daisy chain cascade arrangement as defined in claim 12 wherein:
the producing circuitry of the first memory device comprises circuitry for adding a predetermined value to the first value to produce the second value.

* * * * *